United States Patent
Ferguson et al.

(10) Patent No.: US 7,697,544 B1
(45) Date of Patent: *Apr. 13, 2010

(54) MULTI-PROTOCOL LABEL SWITCHING IN A NETWORK DEVICE

(75) Inventors: Dennis C. Ferguson, Palo Alto, CA (US); Der-Hwa Gan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 11/740,584

(22) Filed: Apr. 26, 2007

Related U.S. Application Data

(63) Continuation of application No. 10/192,859, filed on Jul. 11, 2002, now Pat. No. 7,227,867.

(60) Provisional application No. 60/372,428, filed on Apr. 16, 2002.

(51) Int. Cl.
*H04L 12/28* (2006.01)

(52) U.S. Cl. .................................................. 370/395.5

(58) Field of Classification Search ......... 370/351–392, 370/395.5, 400, 401
See application file for complete search history.

(56) References Cited

U.S. PATENT DOCUMENTS

| | | | | |
|---|---|---|---|---|
| 5,991,300 A * | 11/1999 | Tappan | ........................ | 370/392 |
| 6,330,614 B1 | 12/2001 | Aggarwal et al. | ............ | 709/236 |
| 6,567,406 B1 | 5/2003 | Skemer | ........................ | 370/392 |
| 6,625,650 B2 | 9/2003 | Stelliga | ........................ | 709/226 |
| 6,735,190 B1 | 5/2004 | Chuah et al. | ................. | 370/352 |
| 6,771,662 B1 | 8/2004 | Miki et al. | .................... | 370/469 |
| 6,798,757 B2 | 9/2004 | Mizutani et al. | ............ | 370/329 |
| 6,801,545 B2 | 10/2004 | Stewart | ........................ | 370/473 |
| 6,944,168 B2 | 9/2005 | Paatela et al. | ................. | 370/401 |
| 7,126,944 B2 * | 10/2006 | Rangarajan et al. | ......... | 370/389 |
| 7,227,867 B1 * | 6/2007 | Ferguson et al. | ......... | 370/395.5 |
| 7,369,766 B2 * | 5/2008 | Bannister et al. | .............. | 398/51 |
| 7,424,019 B1 * | 9/2008 | Kopelman et al. | .......... | 370/392 |
| 2001/0025321 A1 * | 9/2001 | Tang et al. | ................... | 709/246 |
| 2003/0118053 A1 * | 6/2003 | Edsall et al. | ................ | 370/474 |

OTHER PUBLICATIONS

Dennis C. Ferguson et al.; U.S. Appl. No. 10/192,859; entitled "Multi-Protocol Label Switching in a Network Device"; filed Jul. 11, 2002; 47 pages.

* cited by examiner

*Primary Examiner*—Dmitry H Levitan
(74) *Attorney, Agent, or Firm*—Harrity & Harrity, LLP

(57) ABSTRACT

A network device for processing data packets includes input logic, a register, route lookup logic and output processing logic. The input logic receives a data packet having at least one multi-protocol label switching (MPLS) tag, stores the packet and forwards a portion of the packet including the MPLS tag. The route lookup logic receives the portion of the packet, generates next hop information based on the MPLS tag and determines whether at least one MPLS tag is to be removed from the packet before the packet is to be output by the network device. The route lookup logic also modifies a start offset value in the register for each MPLS tag that is to be removed and forwards the start offset. The output processing logic receives the start offset and begins processing the data packet for output at a location identified by the start offset.

24 Claims, 8 Drawing Sheets

MULTI-PROTOCOL LABEL SWITCHING IN A NETWORK DEVICE

RELATED APPLICATIONS

This application is a continuation of U.S. patent application Ser. No. 10/192,859, filed Jul. 11, 2002, now U.S. Pat. No. 7,227,867, which claims priority under 35 U.S.C. §119 based on U.S. Provisional Application Ser. No. 60/372,428, filed Apr. 16, 2002, the disclosures of which are incorporated herein by reference.

BACKGROUND OF THE INVENTION

1. Field of the Invention

The present invention relates generally to data networks and, more particularly, to multi-protocol label switching in a network device.

2. Description of Related Art

Multi-protocol label switching (MPLS) is a forwarding scheme in which packet forwarding is based on one or more MPLS labels included in the packet. For example, FIG. 1 illustrates an exemplary data packet 100 transmitted in accordance with MPLS. Data packet 100 includes header 110, MPLS label 120 and payload 130.

Header 110 may include source and destination information for data packet 100, such as a data link layer header. MPLS label 120, also referred to hereafter as a tag, is a 4-byte field that includes a 20-bit label 122, a 3-bit class of service (CoS) identifier 124, a bottom of stack (S) bit 126, and an 8-bit time-to-live (TTL) field 128. Label 122 includes information for identifying the next hop for data packet 100. CoS identifier 124 indicates the class of service with which the packet should be handled. Bottom of stack bit 126 may indicate whether MPLS label 120 is the bottom label in a stack of labels. For example, a packet may include a number of labels similar to MPLS label 120. Typically, when multiple MPLS labels are present, the MPLS labels 120 are organized as a last-in, first-out stack referred to as a label stack. Bottom of stack bit 126 identifies whether MPLS label 120 is the bottom label in the label stack. TTL field 128 may include a count value that identifies the number of hops/links over which a packet may be routed and may be used to prevent a packet from staying in a network indefinitely. TTL field 128 may be decremented at each hop that data packet 100 takes. When the count value in a packet's TTL field 128 reaches zero or some other predetermined value, the data packet may be discarded. Payload 130 may include the actual payload of data packet 100, such as a conventional Internet Protocol (IP) packet. For example, payload 130 may include an IPv4 or an IPv6 packet.

In conventional network routing, a router uses the information in payload 130 to determine the next hop(s) for data packet 100. In MPLS routing, a router uses the information in MPLS label 120 to determine how to route packet 100 to its intended destination(s).

During processing of packet 100, the router may "pop" one or more of the tags (i.e., remove one or more of the tags from the packet). For example, if a label stack is present, the router may pop one or more tags from the top of the label stack. The router may also "push" tags onto the packet (i.e., add one or more tags to the packet). For example, if a label stack is present, the router may add one or more tags to the top of the label stack. When tags are popped, TTL field 128 is typically copied to the next tag in the stack. Similarly, when tags are pushed, TTL field 128 is typically copied from the top tag in the stack to the new tag.

A problem associated with processing MPLS packets occurs in the popping and pushing of tags. For example, in some routers, when a data packet is received, the data packet is written to a memory. In this situation, copying a TTL field from a popped tag to the next tag in the stack may require accessing the memory where the data packet is stored. For example, the router may read the packet from memory, delete the popped tag, copy the TTL from the popped tag to the next tag in the stack and restore the modified packet in memory. Accessing the memory in this manner increases internal router bandwidth requirements associated with reading/writing data to/from the memory. Such bandwidth requirements are typically costly and may increase latency associated with forwarding MPLS packets.

Therefore, there exists a need for systems and methods that improve the processing associated with MPLS packets.

SUMMARY OF THE INVENTION

Systems and methods consistent with the present invention address this and other needs by using route lookup logic to store information associated with changes to be made to a data packet stored in memory without actually accessing the data packet in memory. Output processing logic may then use this information to process the data packet for transfer to the network.

In accordance with the principles embodied and broadly described herein, a network device including input logic, a first register, route lookup logic and output processing logic is provided. The first register is configured to store a first value. The input logic is configured to receive a data packet, the data packet comprising multi-protocol label switching (MPLS) information comprising at least one MPLS tag, and forward a portion of the data packet, the portion including the MPLS information. The route lookup logic is configured to generate forwarding information identifying a next hop for the data packet based on the MPLS information and determine whether at least one MPLS tag is to be removed from the data packet before the data packet is to be output by the network device. The route lookup logic is also configured to modify the first value stored in the first register for each MPLS tag that is to be removed. The output processing logic is configured to bypass part of the data packet for output processing based on the first value.

In another implementation, a method for processing data packets in a network device includes receiving a data packet, where the data packet includes MPLS information having at least one MPLS tag. The method also includes removing at least one MPLS tag from the data packet. The method further includes modifying a first value representing a start offset based on a number of MPLS tags that are to be removed and modifying a second value representing a time-to-live offset based on the number of MPLS tags that are to be removed. The method also includes processing the data packet for output based on the first value.

In a further implementation, a network device includes a first memory configured to store a start offset (SOF) and first logic configured to receive a data packet including at least one MPLS tag. The network device also includes second logic configured to generate forwarding information identifying a next hop for the data packet based on the at least one MPLS tag, determine whether at least one MPLS tag is to be removed from the data packet before the data packet is to be output by the network device, and modify the SOF for each MPLS tag that is to be removed. The network device further includes third logic configured to begin processing the data packet for output from a location identified by the SOF.

In still another implementation, a network device includes a memory configured to store a data packet and route lookup logic. The route lookup logic is configured to receive multi-protocol label switching (MPLS) information included with the data packet, the MPLS information comprising at least one MPLS tag, wherein each MPLS tag includes a time-to-live (TTL) field. The route lookup logic is also configured to generate, without accessing the memory, forwarding information identifying a next hop for the data packet based on the MPLS information. The route lookup logic is further configured to modify a TTL offset value based on a number of MPLS tags that are to be removed from the data packet.

In yet another implementation, a device includes at least one memory configured to store next hop information associated with a data packet, a first value and a second value. The device also includes route lookup logic configured to determine whether at least one multi-protocol label switching (MPLS) tag is to be removed from the data packet before the data packet is to be output by the device, and increment the first value stored in the memory based on a number of MPLS tags that are to be removed. The device further includes output processing logic configured to receive the next hop information, the first value and the second value, drop a portion of the data packet based on the first value, and identify a time-to-live (TTL) value based on the second value.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Exemplary Network Device Configuration

Figure 2:
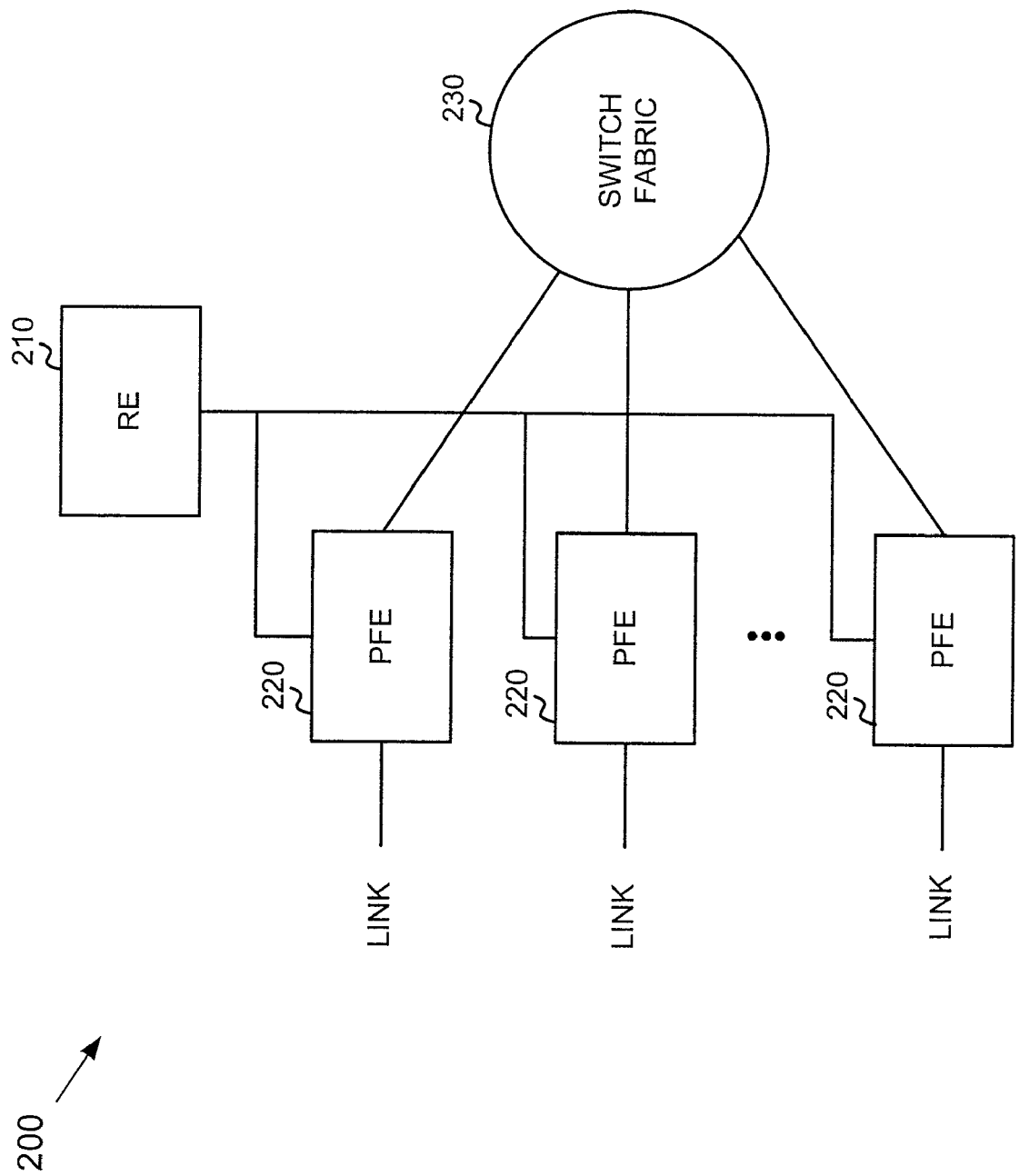
FIG. 2 is a diagram of an exemplary network device in which systems and methods consistent with principles of the invention may be implemented.

FIG. 2 is a diagram of an exemplary network device 200 in which systems and methods consistent with principles of the invention may be implemented. In this particular implementation, network device 200 may be a router. Router 200 may receive one or more packet streams from a physical link, process the stream(s) to determine destination information, and transmit the stream(s) on one or more links based on the destination information.

Router 200 may include a routing engine (RE) 210 and multiple packet forwarding engines (PFEs) 220 interconnected via a switch fabric 230. Switch fabric 230 may include one or more switching planes to facilitate communication between two or more of PFEs 220. In an implementation consistent with principles of the invention, each of the switching planes includes a three-stage switch of crossbar elements.

RE 210 may include processing logic that performs high-level management functions for router 200. For example, RE 210 may communicate with other networks and systems connected to router 200 to exchange information regarding network topology. RE 210 may create routing tables based on network topology information, create forwarding tables based on the routing tables and send the forwarding tables to PFEs 220. PFEs 220 use the forwarding tables to perform a route lookup for incoming packets. PFEs 220 may also receive MPLS packets, i.e., data packets having one or more MPLS tags. For MPLS packets, PFEs 220 use the information included in the MPLS tag(s) to identify the next hop(s) for the packets. RE 210 also performs other general control and monitoring functions for router 200.

Each of PFEs 220 connects to RE 210 and switch fabric 230. PFEs 220 receive packets on physical links connected to a network, such as a wide area network (WAN), local area network (LAN), wireless network, or other network element. Each physical link could be one of many types of transport media, such as optical fiber or Ethernet cable. The packets on the physical link are formatted according to one of several protocols, such as the synchronous optical network (SONET) standard or Ethernet.

Figure 3:
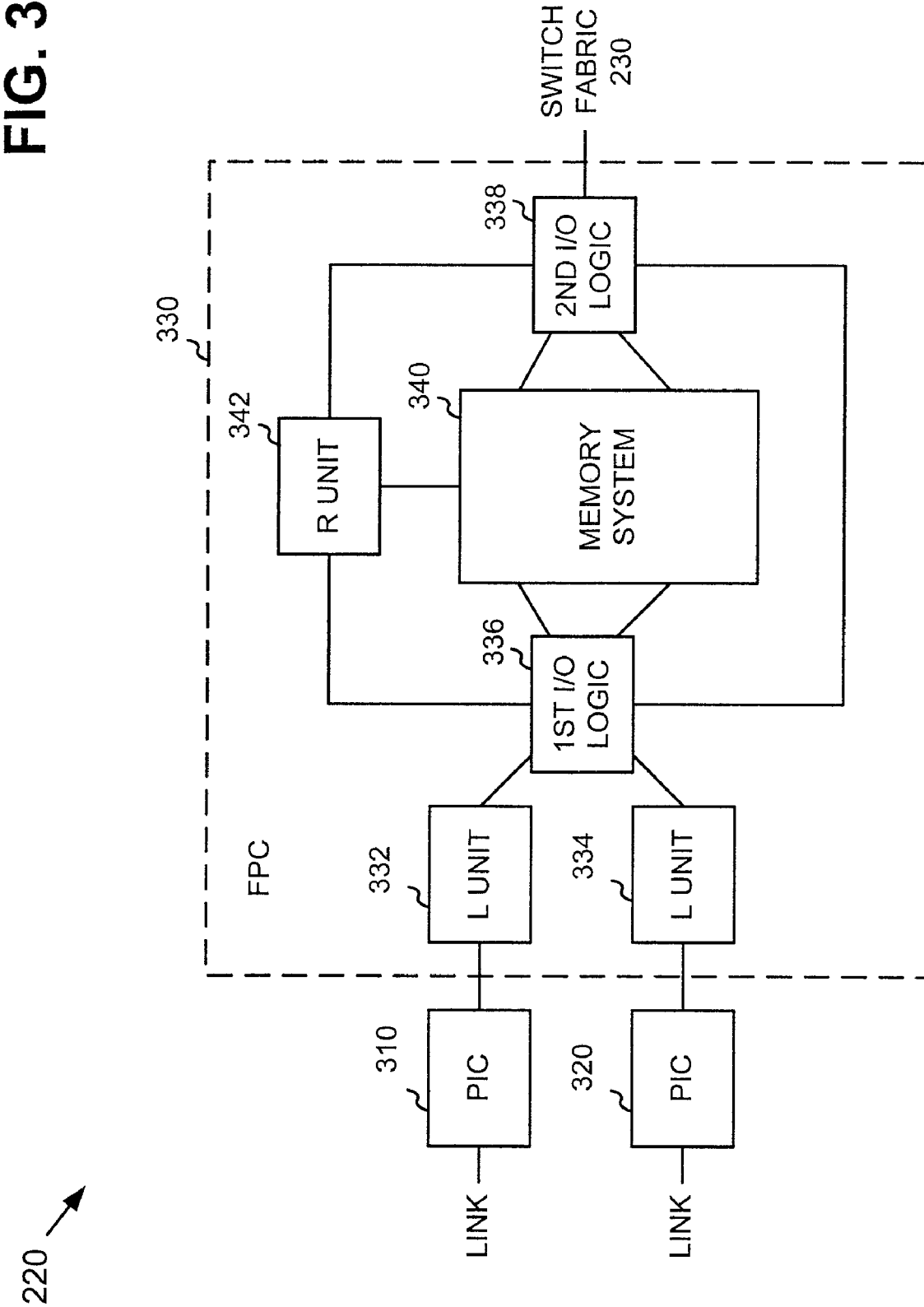
FIG. 3 is an exemplary diagram of a packet forwarding engine (PFE) of FIG. 2 according to an implementation consistent with principles of the invention.

FIG. 3 is an exemplary diagram of a PFE 220 according to an implementation consistent with the principles of the invention. PFE 220 may include physical interface cards (PICs) 310 and 320 connected to a flexible port concentrator (FPC) 330. While two PICs 310 and 320 are shown in FIG. 3, there may be more or fewer PICs in other implementations.

PICs 310 and 320 connect to physical links and FPC 330 and transport data between the physical links and FPC 330. Each of PICs 310 and 320 includes interfacing, processing, and memory elements necessary to transmit data between a physical link and FPC 330. Each of PICs 310 and 320 may be designed to handle a particular type of physical link. For example, a particular PIC may be provided to handle only Ethernet communications.

For incoming data, PICs 310 and 320 may strip off the layer 1 (L1) protocol information and forward the remaining data to FPC 330. For outgoing data, PICs 310 and 320 may receive packets from FPC 330, encapsulate the packets in L1 protocol information, and transmit the data on the physical link.

FPC 330 performs packet transfers between PICs 310 and 320 and switch fabric 230. For each packet it handles, FPC 330 may perform a route lookup based on packet header information to determine destination information and send the packet to PIC 310, PIC 320 or switch fabric 230, depending on the destination information. FPC 330 may also perform MPLS routing in accordance with MPLS tags included with a packet, as described in more detail below. In this case, FPC 330 does not perform a route lookup based on the packet header information, but uses the MPLS tag as a lookup index into a label forwarding table.

FPC 330 may include L units 332 and 334, first input/output (I/O) logic 336, second input/output (I/O) logic 338, memory system 340, and R unit 342. Each of L units 332 and 334 corresponds to one of PICs 310 and 320. L units 332 and 334 may process packet data flowing between PICs 310 and 320, respectively, and first I/O logic 336. Each of L units 332 and 334 may process data flowing in two directions: a first direction corresponding to processing packet data received from PIC 310 or 320 and a second direction corresponding to processing packet data received from first I/O logic 336.

In the first direction, L unit 332 or 334 may process packets from PIC 310 or 320, respectively, convert the packets into data (D) cells, and transmit the D cells to first I/O logic 336. D cells are the data structure used internally by FPC 330 for transporting and storing data. In one implementation, D cells are 64 bytes in length. D cells may be formed by explicit bit patterns at the tail and/or head of each data segment of a packet, or may be formed by processing the stream of bits in segments of certain length, such as 64-byte segments.

For outgoing data, L unit 332 or 334 receives D cells from first I/O logic 336, extracts certain fields and packet data from the D cells, and creates a packet based on the extracted information. L unit 332 or 334 creates the packet header from the fields extracted from the D cells. L unit 332 or 334 may load the packet data portion with the packet data from the D cells.

First I/O logic 336 and second I/O logic 338 coordinate data transfers into and out of FPC 330. First I/O logic 336 receives D cells from L units 332 and 334, and second I/O logic 338 receives D cells from switch fabric 230. Upon receiving D cells for a packet, the I/O logic extracts certain fields from the D cells and creates a notification based on the extracted fields.

First I/O logic 336 and second I/O logic 338 store the D cells in memory system 340. The location of each D cell is also stored in the notification. In one implementation, instead of storing addresses in the notification, only the address of the first D cell is stored in the notification, and the remaining D cell locations are identified in the notification by offsets from the address of the preceding D cell. If the notification cannot store all the D cell addresses, the overflow D cell offsets are stored in memory system 340 in indirect address cells (I cells). After storing the D cells and I cells for a packet in memory system 340, first I/O logic 336 and second I/O logic 338 send a notification to R unit 342. While first I/O logic 336 and second I/O logic 338 are shown as separate units, they may be implemented as a single unit in other implementations consistent with principles of the invention.

R unit 342 may include processing logic that provides packet processing functionality, such as route lookup, accounting, and policing functionality. As described previously, PFEs 220 may receive packets with MPLS tags and packets without MPLS tags. The description below assumes that the received packets include MPLS tags. R unit 342 may perform MPLS processing associated with received MPLS packets. More particularly, R unit 342 may use an MPLS tag as a lookup index into a label forwarding table (not shown). For each label, the label forwarding table stores data forwarding information. R unit 342 may also pop and push MPLS tags associated with the received MPLS packets as part of the data forwarding process, as described in more detail below. R unit 342 may insert the results of the MPLS processing into a notification received from first I/O logic 336 or second I/O logic 338, which it may store in memory system 340. For example, R unit 342 may, if necessary, increment a start offset (SOF) value, increment a TTL offset value and modify a protocol type associated with the data packet while processing MPLS packets, as described in more detail below.

Memory system 340 may be implemented as one or more memory devices. Memory system 340 may temporarily store data from first I/O logic 336 and second I/O logic 338 and notifications from R unit 342. A notification may include routing information, such as the source and destination of the packet, quality of service (QoS) information, validity information, priority information, and data length information. A notification may also include an SOF value, a TTL offset value and protocol information associated with processing the MPLS packet.

As previously discussed, a notification may further include data cell address information and address offset information. The data cell address may store an actual address of a data cell, such as the first data cell, stored in memory system 340. The address offset information may store data that identifies an offset for each of the remaining data cells for the packet stored in memory system 340. For example, each offset may define the location of a D cell relative to the location defined by the previous offset. In an implementation consistent with the principles of the invention, the data cells of a packet are stored at non-contiguous locations within memory system 340. For example, memory system 340 may include a number of data banks. Data cells from one packet may be distributed among one or more of the memory banks.

As also discussed previously, R unit 342 may pop tags and push tags associated with a received packet. According to an exemplary implementation consistent with principles of the invention, R unit 342 effectively pops and pushes tags and tracks information associated with the SOF value and TTL offset value without accessing memory system 340, as described in more detail below.

Figure 4:
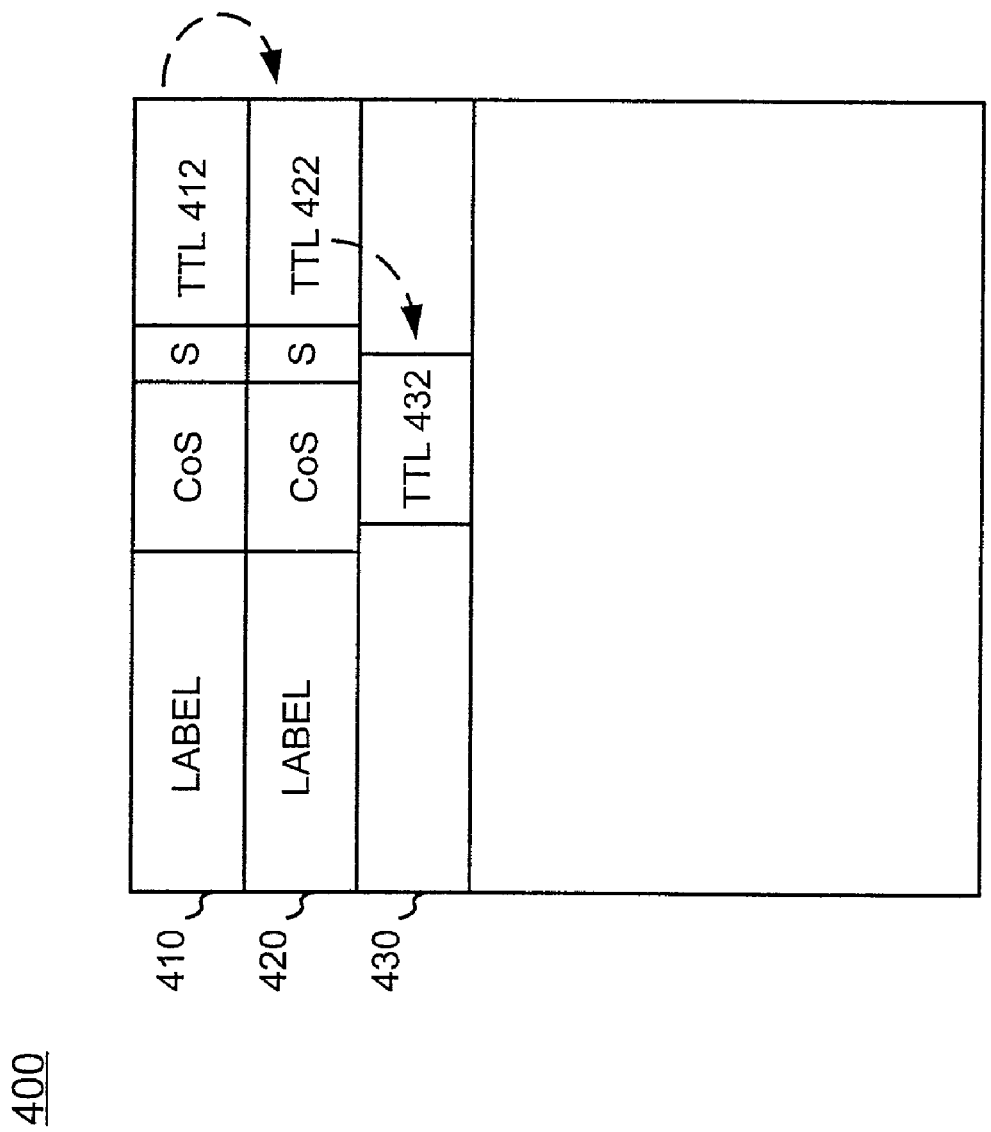
FIG. 4 illustrates a portion of an exemplary data packet that may be processed according to an implementation consistent with principles of the invention.

For explanatory purposes, assume that PIC 310 receives the data packet illustrated in FIG. 4. Referring to FIG. 4, data packet 400 illustrates a portion of an exemplary data packet that may be processed by router 200 in an implementation consistent with principles of the invention. Data packet 400 includes two MPLS tags 410 and 420 that are in a conventional data packet, such as an Internet Protocol (IP) data packet, labeled 430. The header field of data packet 400 is not shown for simplicity. It should be understood that data packet 400 may include any conventional data link layer header, such as an Ethernet header. In addition, exemplary data packet 400 includes two MPLS tags for simplicity. It should also be understood that router 200 may process data packets having more or fewer tags.

Figure 1:
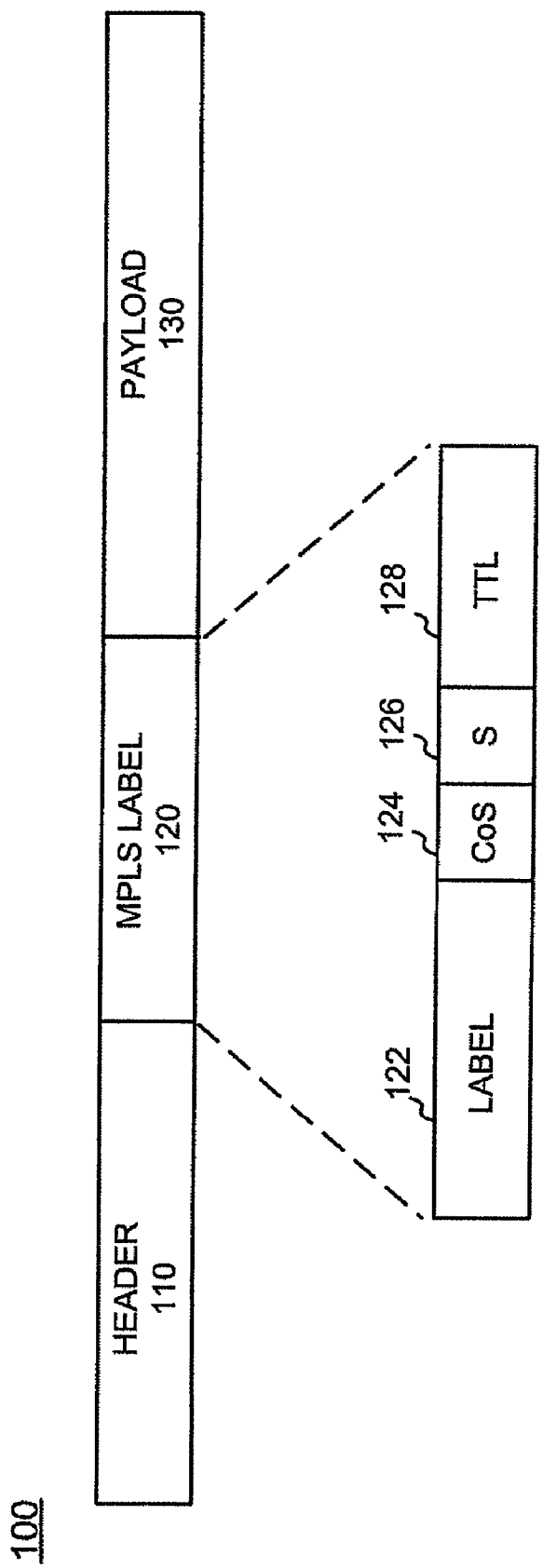
FIG. 1 is a diagram of an exemplary MPLS data packet.

Tags 410 and 420 are conventional MPLS tags that are each 4-bytes in length. Tags 410 and 420 each include a label field, CoS field, S field and TTL field, as shown in FIG. 4. These fields are similar to the fields described above in relation to FIG. 1. IP packet 430 includes a header field and a payload field. The header field may include TTL field 432. As described previously, in conventional systems, when a tag is popped, the TTL field from a popped tag is copied to the next tag on the stack. For example, when tag 410 is popped, the value in TTL field 412 may be copied to TTL field 422, as indicated by the dashed lines in FIG. 4. Similarly, when tag 420 is popped, the value in TTL field 422 is copied to TTL field 432 in IP packet 430, as indicated by the dashed lines in FIG. 4.

Figure 5:
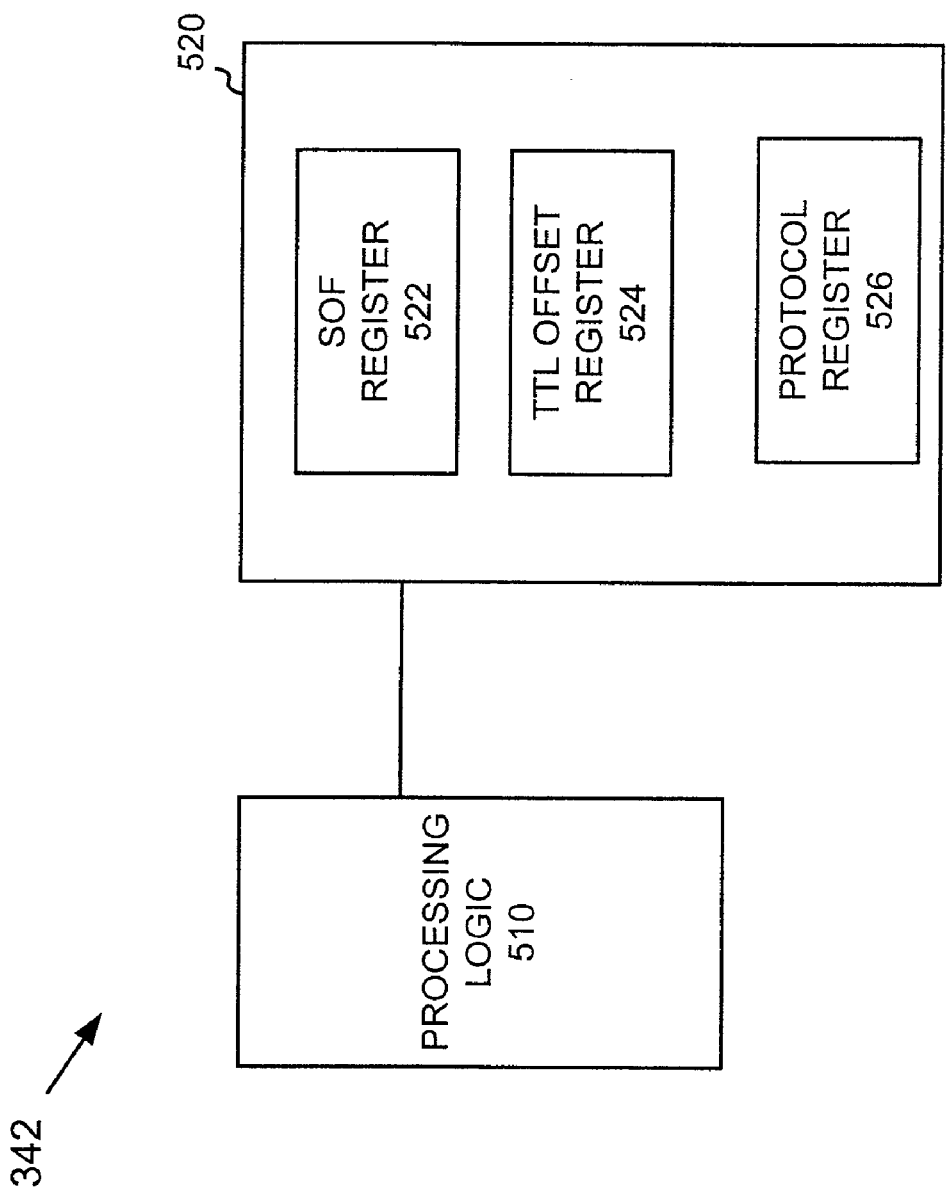
FIG. 5 is an exemplary diagram of a portion of the R unit of FIG. 3 according to an implementation consistent with principles of the invention.

FIG. 5 is an exemplary diagram of a portion of R unit 342 according to an implementation consistent with principles of the invention. R unit 342 includes processing logic 510 and memory 520. Processing logic 510 receives information extracted from the data packet and identifies next hop information for the data packet.

Memory 520 may be a conventional memory device, such as a static random access memory (SRAM) that stores information associated with processing MPLS packets. For example, memory 520 may include an SOF register 522, a TTL offset register 524 and a protocol register 526. SOF register 522 may indicate the particular point from which output logic, such as L unit 332 or 334, will begin processing a data packet stored in memory system 340. For example, each time a tag is popped, processing logic 510 may increment SOF register 522. L unit 332 or 334 may then use this information to ignore information corresponding to popped tags when processing the data packet for output. In this manner, processing logic 510 uses SOF register 522 to store information to effectively enable R unit 342 to pop tags without reading and rewriting the data packet stored in memory system 340.

TTL offset register 524 may store a value that identifies an MPLS tag in a label stack from which to copy a TTL value. For example, when processing logic 510 receives a packet with a number of MPLS tags, processing logic 510 may pop the top tag in a stack that identifies router 200. R unit 342 advantageously keeps track of the TTL associated with the popped tag using TTL offset register 524. For example, each time a tag is popped, processing logic 510 may increment TTL offset register 524 for later use by output processing logic, such as L unit 332 or 334. In this manner, L unit 332 or 334 may use the TTL value in TTL offset register 524 to identify the MPLS tag from which to copy the TTL value for output processing. This permits R unit 342 to track the appropriate TTL value for output processing without accessing memory system 340 to modify the data packet, thereby saving valuable read bandwidth associated with reading and writing to memory system 340.

Protocol register 526 identifies a protocol type of the data packet that will be output from router 200. For example, after processing logic 510 pops one or more tags from an MPLS packet, the remaining packet to be forwarded may no longer be an MPLS packet. In this case, processing logic 510 stores a value in protocol register 526 identifying the particular type of packet, such as an IP packet, that will be output by router 200.

By using registers 522-526, processing logic 510 provides L units 332 and 334 with information regarding an MPLS data packet stored in memory system 340 that may include a number of MPLS labels. R unit 342 may provide this information to L unit 332 or 334 in a notification that is passed to the particular L unit via first I/O logic 336. L unit 332 or 334 receives the information, processes the packet in accordance with the received information and forwards the data packets to their appropriate destination via PIC 310 or PIC 320, as described in more detail below.

Exemplary Processing

Figure 6:
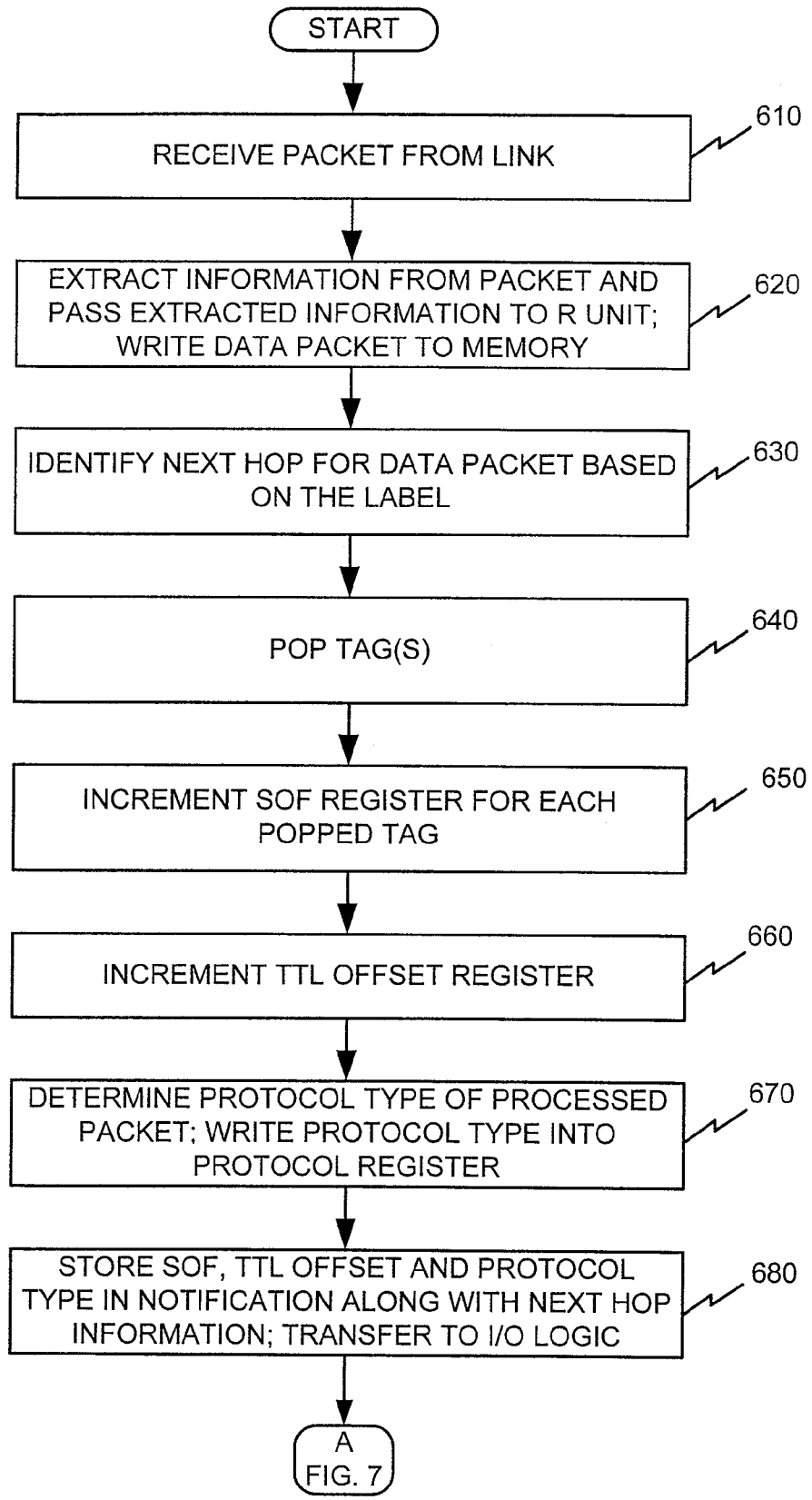
FIGS. 6 and 7 are flow diagrams of exemplary processing associated with MPLS routing according to an implementation consistent with principles of the invention.
Figure 7:
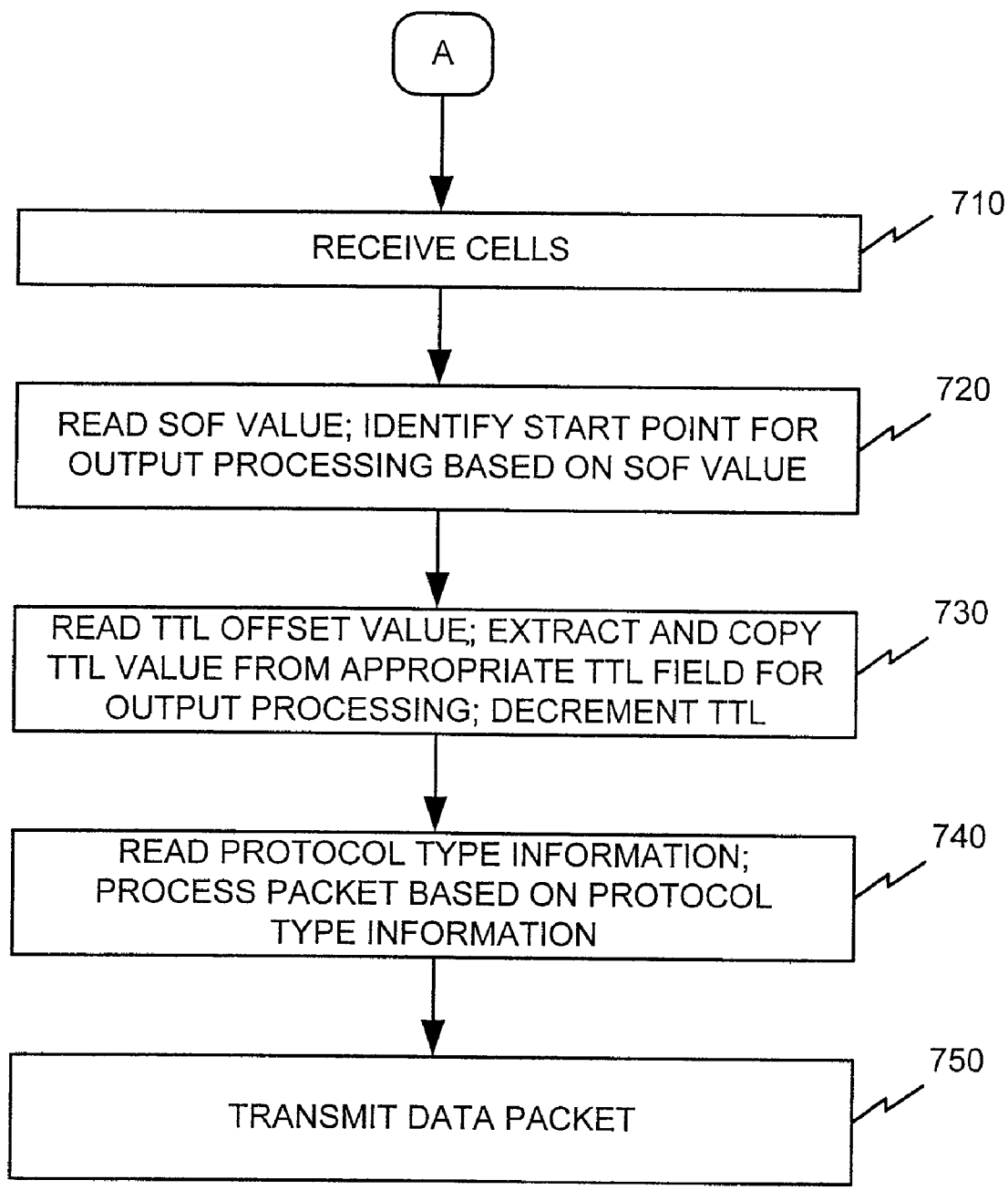

FIGS. 6 and 7 are flow diagrams illustrating exemplary processing associated with MPLS routing, according to an implementation consistent with principles of the invention. Processing may begin with PIC 310 receiving data packets from the link (act 610). Assume that PIC 310 receives an MPLS packet.

PIC 310 forwards the MPLS packet to L unit 332, which may then forward the packet to first I/O logic 336. First I/O logic 336, as described previously, may extract information from the data packet, such as header information associated with the packet and MPLS tag(s) included with the packet. First I/O logic 336 passes the extracted information to R unit 342 and may also write the packet to memory system 340 (act 620).

R unit 342 identifies that the packet is an MPLS packet and processes the packet in accordance with MPLS rules. For example, R unit 342 may use the top label in a label stack as a lookup index into a label forwarding table (not shown) to identify the next hop for the data packet (act 630). If R unit 342 cannot find the label in its label forwarding table, the packet may be dropped.

In accordance with an exemplary implementation consistent with principles of the invention, R unit 342 may determine that one or more of the tags is to be popped (act 640). Processing logic 510 defines the rules associated with popping and pushing tags in accordance with MPLS conventions. For example, when the top tag in a stack (i.e., tag 410) identifies router 200, processing logic 510 may determine that tag 410 is to be popped before the data packet is forwarded to the next hop to ensure that the packet is properly routed.

In each case, processing logic 510 tracks the number of tags that are to be popped. Processing logic 510 also tracks the location of the TTL from which L unit 332 will copy the corresponding TTL value for output processing associated with the outgoing data packet.

For example, assume that processing logic 510 determines that tag 410 of data packet 400 is to be popped. In this scenario, processing logic 510 increments SOF register 522 by "4," representing a 4-byte tag that is to be ignored on output processing (act 650). Alternatively, processing logic 510 may increment SOF register 522 by "1" each time that it determines a tag is to be popped to indicate that one 4-byte tag included in the data packet is to be bypassed. In this case, the output processing logic would skip four bytes for each increment of SOF register 522. In either case, processing logic 510 effectively removes the tag from packet 400, from the point of view of L unit 332, by incrementing SOF register 522 and without accessing the actual data packet stored in memory system 340.

Processing logic 510 may also increment TTL offset register 524 by "1" when it determines that a tag is to be popped (act 660). By incrementing TTL offset register 524 by "1," processing logic 510 tracks the location of the TTL value which will be used by L unit 332 for processing the outgoing data packet. For example, a TTL offset value of 1 indicates that output processing logic must copy the TTL from a previous tag into the TTL field of an outgoing data packet, as described in more detail below.

In the example described above with respect to data packet 400, further assume that processing logic 510 determines that tag 420 is to be popped. For example, tag 420 may represent a virtual local area network (VLAN) or virtual private network (VPN) to which router 200 is to forward the data packet. In this case, processing logic 510 identifies the next hop information associated with the particular VLAN/VPN and again increments SOF register 522 by 4, representing a 4-byte tag that is to be bypassed on output processing (act 650). In other words, in this example, the value in SOF register 522 after tags 410 and 420 are popped may be "8," indicating that 8-bytes (i.e., two 4-byte tags) are to be popped from data packet 400. Processing logic 510 may also increment TTL offset register 524 by 1 so that the new TTL offset value is "2" (act 660). This indicates that L unit 332 will have to copy the TTL value from the TTL field of a tag that is located two tags prior to where L unit 332 will begin processing the outgoing data packet 400.

In this manner, SOF register 522 stores a value that indicates the number of bytes of a packet to ignore (or the number of popped tags) and TTL offset register 524 stores a value that indicates the tag from which L unit 332 will extract and copy the TTL value for output processing. In the scenario described above, both SOF register 522 and TTL offset register 524 were incremented each time processing logic 510 determined that a tag was to be popped. However, in other scenarios, processing logic 510 may not increment the TTL register 524 each time a tag is popped based on the particular data packet. In other situations, processing logic 510 may want to use the TTL value in a particular tag or the TTL value in the header of an IP packet, such as IP packet 430. In this situation, processing logic 510 may set the TTL offset register 524 to "0," indicating that L unit 332 will not have to copy a TTL value from a previous TTL field for output processing.

Processing logic 510 also identifies the type of packet that remains after performing the MPLS processing (act 670). For example, when the second tag (i.e., tag 420) is popped, data packet 400 is effectively a conventional IP packet since both MPLS tags 410 and 420 have been removed. In this scenario, processing logic 510 writes a value in protocol register 526 corresponding to the type of packet that remains after MPLS processing. For example, in the above scenario, processing logic 510 writes a value into protocol register 526 indicating that the data packet to be output is an IP packet (act 670). In this manner, L unit 332 may process the packet as an IP packet regardless of how the packet entered router 200.

R unit 342 may store the values from SOF register 522, TTL offset register 524 and protocol register 526 in a notification along with the next hop information (act 680). R unit 342 sends the notification to first I/O logic 336 and first I/O logic 336 uses the notification to extract the cells for the packet from memory system 340. I/O logic 336 may also update the cells using information in the notification received from R unit 342. The updated information may include information updated by R unit 342, such as SOF, TTL, etc. I/O logic may then forward the cells to L unit 332 (act 680).

L unit 332 receives the cells from first I/O logic 336 (act 710). L unit 332 may then read the SOF value in the cells to determine how many tag bytes of the data packet to ignore (act 720). In other words, the SOF value indicates where L unit 332 is to begin processing the cells for output. L unit 332 also drops the tags located prior to the SOF.

Figure 8A:
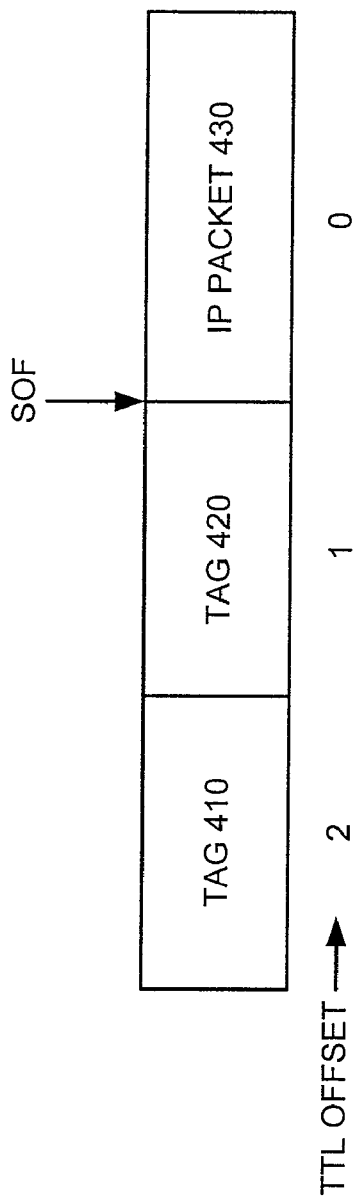
FIGS. 8A and 8B illustrate processing associated with the data packet of FIG. 4 according to implementations consistent with principles of the invention.

L unit 332 also reads the TTL offset value in the cells to identify the corresponding tag from which to copy the TTL value (act 730). For example, in the scenario described above in which the TTL offset is "2," L unit 332 counts back two labels from the SOF point (i.e., the beginning of IP packet 430) to tag 410, (e.g., as shown in FIG. 8A). L unit 332 may then extract and copy the value from the TTL field associated with tag 410 (i.e., TTL field 412, FIG. 4) into TTL field 432. In this manner, the appropriate TTL value gets passed down for output processing. L unit 332 may also decrement this TTL value before outputting the data packet from router 200 (act 730).

L unit 332 also identifies the protocol type information included in the cells (act 740). For example, the protocol type may indicate that the outgoing data packet is an IP packet. L unit 332 may then process the data packet in accordance with its rules regarding that particular type of packet (act 740). For example, router 200 may have different rules associated with processing an IP packet versus an MPLS packet. L unit 332 may process the data packet in accordance with the particular rules associated with an IP packet, independent of the fact that router 200 received the data packet as an MPLS packet. The particular rules associated with processing a particular type of packet, such as an IP packet or MPLS packet, are not described herein in order not to unduly obscure the thrust of the present invention. In any event, L unit 332 forwards the outgoing data packet to PIC 310 for output on the link (act 750).

FIG. 8A illustrates act 720 of FIG. 7. Assume that the SOF value is "8." In this case, L unit 332 uses the SOF value as a pointer to effectively skip the first eight tag bytes of the data packet since the SOF value points to the start of IP packet 430.

The eight bytes that are bypassed or ignored correspond to popped tags 410 and 420, as illustrated in FIG. 8A. Since these tags were only relevant for processing by R unit 342, L unit 332 may ignore these two tags upon output processing and drop these two tags before outputting the data packet.

Figure 8B:
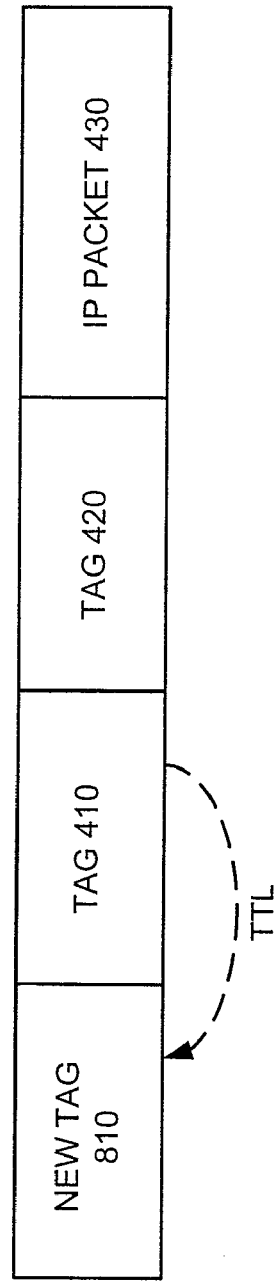

The above processing describes popping tags from a label stack. In situations in which tags may be added to a label stack, similar processing applies. For example, processing logic 510 may track the number of tags that are popped, if any, using SOF register 522. Processing logic 510 may also track the TTL location for copying a TTL value into a new tag using TTL offset register 524. For example, FIG. 8B illustrates data packet 400 with tags 410, 420 and IP packet 430, along with new tag 810. L unit 332 may copy the TTL value from a top tag in a stack, such as tag 410, to new tag 810, as illustrated by the dashed lines in FIG. 8B. Alternatively, L unit 332 may copy the TTL value from the header of IP packet 430, or copy the TTL value from another tag to the new tag based on information received from processing logic 510. In any event, L unit 332 copies the appropriate TTL value into a top label before outputting the data packet. L unit 332 may also decrement the TTL value before outputting the data packet.

The above processing also describes popping conventional MPLS tags. Implementations of the present invention may also provide special handling rules associated with certain tags, such as tags with null labels. For example, an IPv4 packet with a label value of "0" in an MPLS tag or an IPv6 packet with a label value of "2" in an MPLS tag may represent null labels. A null label may indicate that the data packet has only a single MPLS tag. In this case, processing logic 510 may set an output TTL source (OTS) bit in the notification identifying how L unit 332 is to process the data packet. In an exemplary implementation, if OTS is "1," L unit 332 copies the TTL from the null label into the TTL field of the IP header, decrements the TTL value and forwards the data packet. If OTS is "0", L unit 332 may "hide" the TTL in the null label and use the TTL in the IP header for the outgoing data packet. That is, L unit 332 will not copy the TTL value from the null label into the IP header for output processing, but will use the TTL value in the IP header, decrement the TTL value in the IP header and forward the data packet.

Conclusion

Systems and methods consistent with the principles of the invention provide a mechanism for effectively popping and pushing MPLS tags and tracking the appropriate TTL value for output processing without reading the data packet from memory and rewriting the modified packet information. This enables the router to write and read the data packet once from memory, thereby reducing internal memory bandwidth requirements. This may also reduce latency associated with forwarding data packets. Systems and methods consistent with principles of the invention also provide a mechanism for processing a data packet for output based on the protocol of the outgoing packet, independent of the protocol associated with the received data packet. This enables the router to process data packets in an efficient manner.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, certain portions of the invention have been described as "logic" that performs one or more functions. This logic may include hardware, such as an application specific integrated circuit (ASIC) or a field programmable gate array (FPGA), software or a combination of hardware and software. Further, while a series of acts has been described in relation to FIGS. 6 and 7, the order of the acts may vary in other implementations when a particular order is not required. In addition, while systems and methods have been described in terms of a network device, such as a router, the present invention may have applicability in other devices, such as switches, where MPLS routing may be required. Systems and methods consistent with the principles of the invention may also be used in the context of MPLS-like implementations, such as tag switching Lastly, while some processing has been described as being performed by particular components of the network device, it should be understood that the processing described as being performed by one component may be performed by other components in alternative implementations of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A network device, comprising:
   a first register to store a first value;
   input logic to:
      receive a data packet, the data packet comprising multi-protocol label switching (MPLS) information comprising at least one MPLS tag, and
      forward a portion of the data packet, the portion including the MPLS information;
   route lookup logic to:
      generate forwarding information identifying a next hop for the data packet based on the MPLS information,
      determine whether at least one MPLS tag is to be removed from the data packet before the data packet is to be output by the network device, and
      modify the first value stored in the first register for each MPLS tag that is to be removed; and
   output processing logic to:
      bypass part of the data packet for output processing based on the first value.

2. The network device of claim 1, where the first value represents a start offset (SOF) and the output processing logic is further to begin processing the data packet at a location identified by the SOF.

3. The network device of claim 2, where the bypassed part of the data packet corresponds to the at least one MPLS tag that is to be removed and the output processing logic is further to drop the at least one MPLS tag before outputting the data packet.

4. The network device of claim 1, where each MPLS tag includes a time-to-live (TTL) field, the network device further comprising:
   a second register to store a TTL offset; and the route lookup logic being further to:
   modify the TTL offset stored in the second register based on a number of MPLS tags that are to be removed from the data packet.

5. The network device of claim 4, where the output processing logic is further to:
   copy a TTL value from a TTL field identified by the TTL offset into a TTL field of the data packet.

6. The network device of claim 5, where the output processing logic is further to:
   decrement the TTL value before outputting the data packet.

7. The network device of claim 1, where each MPLS tag includes a time-to-live (TTL) field, the network device further comprising:
   a second register to store a TTL offset; and the route lookup logic being further to:
   set the TTL offset to zero based on information included in the data packet, and the output processing logic being further to:
   process the data packet without copying a TTL value included in a TTL field of an MPLS tag being removed into the data packet.

8. The network device of claim 1, where the output processing logic is further to:
   add at least one MPLS tag to the data packet,
   copy a time-to-live (TTL) value from a TTL field of the data packet to the added MPLS tag, and
   decrement the TTL value before outputting the data packet.

9. A method for processing data packets in a network device, the method comprising:
   receiving a data packet, the data packet including multi-protocol label switching (MPLS) information comprising at least one MPLS tag;
   removing at least one MPLS tag from the data packet;
   modifying a first value representing a start offset (SOF) based on a number of MPLS tags that are to be removed;
   modifying a second value representing a time-to-live (TTL) offset based on the number of MPLS tags that are to be removed; and
   processing the data packet for output based on the first value.

10. The method of claim 9, where the processing the data packet for output includes:
    reading a value from a TTL field identified by the second value,
    decrementing the value from the identified TTL field, and
    inserting the decremented value into the data packet before outputting the data packet.

11. The method of claim 9, where the processing the data packet for output includes:
    bypassing a portion of the data packet, the bypassed portion corresponding to at least one MPLS tag that is to be removed, and
    dropping the at least one MPLS tag that is to be removed before outputting the data packet.

12. The method of claim 9, further comprising:
    setting the second value to zero based on information included in the data packet, and when the second value is zero, the processing the data packet for output includes processing the data packet without copying a TTL value from an MPLS tag that is to be removed.

13. A network device, comprising:
    a first memory to store a start offset (SOF);
    first logic to:
       receive a data packet including at least one MPLS tag;
    second logic to:
       generate forwarding information identifying a next hop for the data packet based on the at least one MPLS tag,
       determine whether at least one MPLS tag is to be removed from the data packet before the data packet is to be output by the network device, and
       modify the SOF for each MPLS tag that is to be removed; and
    third logic to:
       begin processing the data packet for output from a location identified by the SOF.

14. The network device of claim 13, where each MPLS tag includes a time-to-live (TTL) field, the network device further comprising:
a second memory to store a TTL offset; and the second logic being further to:
at least one of increment the TTL offset stored in the second register based on a number of MPLS tags that are to be removed from the data packet or set the TTL offset to zero.

15. The network device of claim 14, where the third logic is further to:
retrieve a TTL value from a TTL field identified by the TTL offset when the TTL offset is not zero, and
decrement the TTL value.

16. The network device of claim 15, where the third logic is further to:
insert the decremented TTL value into the data packet.

17. A network device, comprising:
a memory to store a data packet; and
route lookup logic to:
receive multi-protocol label switching (MPLS) information included with the data packet, the MPLS information comprising at least one MPLS tag, where each MPLS tag includes a time-to-live (TTL) field,
generate, without accessing the memory, forwarding information identifying a next hop for the data packet based on the MPLS information, and
modify a TTL offset value based on a number of MPLS tags that are to be removed from the data packet.

18. The network device of claim 17, where the route lookup logic is further to:
determine whether at least one MPLS tag is to be removed from or added to the data packet before the data packet is output by the network device, and
store a first value based on a number of MPLS tags that are to be removed.

19. The network device of claim 18, further comprising:
output processing logic to:
receive the first value, and
drop a portion of the data packet based on the first value.

20. The network device of claim 18, further comprising:
output processing logic configured to:
copy a TTL value from a TTL field identified by the TTL offset value into a TTL field of the outgoing data packet.

21. A device, comprising:
at least one memory to store next hop information associated with a data packet, a first value and a second value;
route lookup logic to:
determine whether at least one multi-protocol label switching (MPLS) tag is to be removed from the data packet before the data packet is to be output by the device, and
increment the first value stored in the memory based on a number of MPLS tags that are to be removed; and
output processing logic to:
receive the next hop information, the first value and the second value,
drop a portion of the data packet based on the first value, and
identify a time-to-live (TTL) value based on the second value.

22. The device of claim 21, where the output processing logic is further to:
modify the identified TTL value, and
insert the modified TTL value into the data packet.

23. A system for processing data packets comprising:
means for receiving a data packet including multi-protocol label switching (MPLS) information comprising at least one MPLS tag;
means for storing a start offset (SOF);
means for identifying next hop information for the data packet based on the at least one MPLS tag;
means for determining whether at least one MPLS tag is to be removed from the data packet before the data packet is to be output by a network device;
means for incrementing the SOF based on a number of MPLS tag that are to be removed; and
means for bypassing a portion of the data packet when processing the data packet for output based on the SOF.

24. The system of claim 23, where each MPLS tag includes a time-to-live (TTL) field, the system further comprising:
means for storing a TTL offset;
means for incrementing the TTL offset based on a number of MPLS tags that are to be removed from the data packet; and
means for copying a TTL value from a TTL field identified by the TTL offset to a TTL field in the data packet.

* * * * *

UNITED STATES PATENT AND TRADEMARK OFFICE
CERTIFICATE OF CORRECTION

PATENT NO. : 7,697,544 B1  Page 1 of 1
APPLICATION NO. : 11/740584
DATED : April 13, 2010
INVENTOR(S) : Dennis C. Ferguson et al.

It is certified that error appears in the above-identified patent and that said Letters Patent is hereby corrected as shown below:

Column 13, Claim 20, line 42, delete the word "configured"

Signed and Sealed this

First Day of June, 2010

David J. Kappos
*Director of the United States Patent and Trademark Office*